United States Patent Office 3,346,563
Patented Oct. 10, 1967

3,346,563
PREPARATION OF QUATERNARY AMMONIUM STARCH ETHERS
Paul R. Shildneck and Robert J. Hathaway, Decatur, Ill., assignors to A. E. Staley Manufacturing Company, Decatur, Ill., a corporation of Delaware
No Drawing. Filed Aug. 7, 1964, Ser. No. 388,264
16 Claims. (Cl. 260—233.3)

This invention relates to preparation of quaternary ammonium ethers of starch. More particularly it relates to preparation of such ethers by reacting starch with monofunctional quaternary ammonium etherifying reagents substantially free of polyfunctional etherifying compounds capable of etherifying starch. The starch ethers thus obtained are substantially free of crosslinks generated during the etherification reaction and, for numerous end uses, are superior to crosslinked products.

For the last ten years there has been considerable interest in cationic starch ethers, particularly those based on the tertiary and quaternary ammonium ethers of starch. These products have received excellent reception in various areas due to their cationic nature. Various routes for preparing these products have been proposed and patented. As pointed out above, this invention is directed to quaternary ammonium ethers of starch. Recently there have been two methods proposed for preparing this class of starch ethers. The first route suggests quaternizing a tertiary amine ether of starch with an alkyl halide. In view of the high concentration of competing hydroxyl groups in the anhydroglucose units of the starch molecule the efficacy of this method is questionable.

The second route comprises reacting starch with a quaternary ammonium compound resulting from the reaction of an epihalohydrin (usually epichlorohydrin) with a tertiary amine. This method of preparation is complicated by difficulties associated with the removal of the by-product epihalohydrin from the quaternary ammonium derivatizing agent and the rapidity and ease with which this by-product undesirably reacts with the starch molecule (see U.S. Patent 2,876,217). Removal of substantially all residual unreacted epihalohydrin from the quaternary ammonium starch etherifying agent prior to the starch reaction is an essential feature of the methods described in U.S. Patent 2,876,217 and 2,995,513.

As is well-known in the starch art, epihalohydrin reacts rapidly with granular starch to inhibit the subsequent pasting of the starch (see U.S. Patent 2,500,950 to Konigsberg). Its presence in a starch etherifying reaction mixture, even in extremely low proportions, leads to starch ethers that are inferior for many end uses. For example, crosslinking leads to inhibited granules having reduced paper filler retention property when the ether is made from ungelatinized starch according to U.S. Patent 2,876,217. Crosslinking also leads to gelatinized products having reduced flocculation property and poor filtration characteristics when the ether is made according to United States Patent 2,995,513.

The words "inhibited" and "closslinked" are used in the manner referred to in the above Konigsberg patent. In general, "inhibited" refers to granular starch that is more resistant to pasting, or gelatinization than the parent starch from which it is made. One way of imparting this resistance to gelatinization is to react granular starch with a polyfunctional reagent such as a reagent having at least two groups selected from halogen or epoxy, such as a compound having two halogen groups, two epoxy groups, or a halogen and epoxy group. See the above Konigsberg patent. Such a reagent is considered to react with molecules of starch to link them to form a larger molecule in the reaction called "crosslinking." The inhibitory effect of the crosslinking is exhibited by the presence of ungelatinized granules of starch that can be separated, for example, by centrifuging, from an otherwise uniform paste made from the granular starch reaction product.

The epihalohydrin route to cationic starch ethers has several other disadvantages besides problems inherent in the presence of unreacted epihalohydrin. Among these are: (1) the pronounced skin-irritating property of epihalohydrins and consequent need for careful and expensive safety measures in factory operations; (2) the relatively high cost of epihalohydrins; and (3) the practical difficulty of preparing the starch etherifying agents in sufficient purity.

The literature is replete with references describing the preparation of compounds having essentially the same structures as the reaction products of epihalohydrins and tertiary amines. These processes comprise reacting hypochlorous acid with an N-allyl quaternary ammonium halide, which process is called herein hypohalogenation. While this reaction yields a suitable cholorohydrin reaction product which is capable of reacting with starch to yield a suitable cationic starch, this reaction also yields sizable quantities of 2,3-dihalopropyl quaternary ammonium compound. In other words, this reaction also results in chlorination of the double bond of the allylic group. As illustrated in Example 16, it is not unusual for 30% of the hypohalogenation product to be dichloro by-product. As indicated in Konigsberg, the starch chemist has generally considered that a compound containing two halogen groups will crosslink starch. The ease with which starch reacts with various etherifying agents is, of course, well known. Surprisingly, we have found that the reaction product of hypochlorous acid and N-allyl quaternary ammonium halide will not crosslink starch through the dichloro impurities. In fact, both halogen atoms of the dihalo impurity appears to be incapable of etherifying starch.

The following equations depict, in accordance with our invention, the formation of quaternary ammonium etherifying reagent and preparation of cationic starch ether therefrom.

(1) $N(R_1R_2R_3) + CH_2=CH-CH_2X \rightarrow$
$CH_2=CH-CH_2-N^+(R_1R_2R_3)X^-$ (2) $CH_2=CH-CH_2-N(R_1R_2R_3)X^- + HOX \rightarrow$
$CH_2(OH)-CHX-CH_2N^+(R_1R_2R_3)X^-$
$+CH_2X-CHX-CH_2N^+(R_1R_2R_3)X^-$ (3) $CH_2OH-CHX-CH_2N^+(R_1R_2R_3)X^- + MOH$
$+ Starch \rightarrow Starch\ O-CH_2-CH(OH)$
$-CH_2N^+(R_1R_2R_3)X^-$ We believe that, in the presence of the alkali, an intermediate reaction takes place by which the halohydroxypropyl quaternary ammonium ether is cyclized to form the epoxide and this reacts with the starch. We have discovered, in effect, that it is possible to form the epoxy etherifying agent and, under the same conditions to react it with the starch. If desired, the quaternary halohydrin may be converted to the epoxide with an alkaline catalyst in the absence of starch and the epoxide then brought into contact with the starch. Under some circumstances the alkali has been found to dehydrohalogenate the 2-halo group and a 3-hydrogen group from the 2,3-dihalopropyl quaternary ammonium compound. Apparently the ethylenic double bond formed during the dehydrohalogenation stabilizes the halogen group so that it is incapable of reacting with the starch. This dehydrohalogenation reaction takes place under relatively mild alkaline conditions and it may very well be that this is the mechanism which prevents the by-product 2,3-di-halopropyl quaternary ammonium compound from crosslinking the starch or reacting with the starch at all.

Equation 1 indicates the reaction of tertiary amine, $N(R_1R_2R_3)$, with allyl halide, $CH_2=CH-CH_2X$, to form allyl quaternary ammonium halide, $$CH_2=CH-CH_2N^+(R_1R_2R_3)X^-$$

Equation 2 shows addition of hypohalous acid, HOX, to allyl quaternary ammonium halide to form the corresponding halohydrin, vicinyl halohydroxypropyl quaternary ammonium halide.

$$CH_2(OH)-CHX-CH_2N^+(R_1R_2R_3)X^-$$

and the 2,3-dihalopropyl quaternary ammonium halide, $HCHX-CHX-CH_2N^+(R_1R_2R_3)X^-$. Equation 3 shows reaction of starch with the vicinal halohydroxypropyl quaternary ammonium compound to form cationic quaternary ammonium starch ether. As indicated earlier, Equation 3 evidently includes the cyclization of the halohydrin quaternary salt in the presence of the base followed by reaction with starch under the same conditions. That is to say, our experimental observations are that in these circumstances the starch is etherified prediminantly by reaction with the epoxide formed in situ. Nevertheless, the halohydrin quaternary salt can be cyclized in the absence of the starch and the resulting product reacted with the starch using the same alkaline catalyst.

The tertiary amines used in our invention are selected from the group consisting of (1) tertiary amines whose three substituents on the nitrogen atoms are selected from the class consisting of alkyl of up to 12 carbon atoms, cyclohexyl, phenyl and benzyl such that when the three substituents are the same, none contains more than 6 carbon atoms and when any one substituent has more than six carbon atoms, the other two are alkyl of up to two carbon atoms, and (2) heterocyclic tertiary amines, wherein the third substituent on the nitrogen of the ring is lower alkyl (up to four carbon atoms), the heterocyclic ring being selected from the group consisting of morpholinyl, pyrrolidyl and piperidyl each having not more than one alkyl ring substituent of up to two carbon atoms. The structural formula for these tertiary amines is:

$$R_1-N-R_2$$
$$|$$
$$R_3$$

wherein $R_1$, $R_2$ and $R_3$ are the substituents, as defined in the preceding sentence, $R_2$ and $R_3$ being two substituents that can be part of the heterocyclic ring.

Trimethylamine ($R_1$, $R_2$ and $R_3$ all being methyl) is the preferred tertiary amine because of (1) its ready availability, (2) its low cost per equivalent weight, (3) its high reactivity with allyl halides to form the quaternary ammonium salts, (4) its high solubility in water and consequent advantageous adaptation to a water medium in the quaternization reaction, and (5) the useful properties of starch ethers derived from the trimethyl quaternary ammonium etherifying reagents.

The following additional tertiary amines may be mentioned as examples which are suitable for our invention:

triethylamine,
triisopropylamine,
tri-n-butylamine,
N,N-dimethyldodecylamine,
N,N-dimethylcyclohexylamine,
N,N-dimethylbenzylamine,
N-methylmorpholine,
N-methylpiperidine,
N-ethylpiperidine,
N,N-dimethylaniline,
N-methylpyrrolidine,
N,N-dimethyl-2-ethylhexylamine,
N-methyl-2-methylmorpholine,
N-methyl-2-ethylmorpholine,
N-methyl-2-methylpiperidine,
N-methyl-2-ethylpiperidine,
N-methyl-2-methylpyrrolidine and
N-methyl-2-ethylpyrrolidine.

Of the three allyl halides—chloride, bromide iodide—the chloride is preferred because of its lower cost per equivalent weight. This advantage more than offsets the associated disadvantage of a slower rate of reaction with tertiary amines to form quaternary ammonium salts.

Another superiority of allyl chloride over the bromide and iodide resides in the fact that the allyl quaternary ammonium chlorides yield no interfering low-solubility halogen addition compounds when they are treated with chlorine water to form the chlorohydrin. Chlorine water oxidizes bromide and iodide ions to the corresponding free halogens, and these, in turn, form addition compounds with the allyl quaternary ammonium salt of such low solubility in water that they frequently separate from reaction solution as an oily or solid phase. This behavior of the allyl quaternary ammonium bromides and iodides is not an insuperable bar to their conversion to the corresponding chlorohydrin, but it is a drawback because it markedly lowers the efficiency of conversion. It is, of course, possible to use bromine water (hypobromous acid) with the allyl bromide quaternary.

As to be expected, reaction of allyl chloride with the higher molecular weight tertiary amines contemplated by our invention is relatively slow up to the boiling point of allyl chloride. Reaction rate can be increased by operating under superatmospheric pressure at elevated temperature. Occasionally therefore, use of the more reactive, higher boiling allyl bromide (or iodide) can be justified.

The tertiary amine and allyl halide are usually reacted together in a liquid diluent or medium to form the intermediate allyl quaternary ammonium halide. One purpose of this technique is to obtain the quaternary ammonium salt in the form of a manageable solution or crystalline precipitate instead of a massive solid block. Another purpose, accomplished by selecting a liquid with a high dielectric constant, e.g.. water, acetone, acetonitrile, methyl alcohol, is to accelerate the quaternization reaction. Likewise, either of the reactants may be used, if liquid, but the tertiary amine, if liquid, is preferable to the allyl halide as a reaction medium to assure having an excess of the former. Water is the preferred quaternization medium for the water-soluble tertiary amines, particularly for trimethylamine. However, with an increasing number of carbon atoms in the amine, the solubility in water decreases and other solvents become necessary. For example, quaternization of triethylamine, N,N-dimethylbenzylamine and N,N-dimethylcyclohexylamine with either allyl chloride or allyl bromide proceeds rather slowly at 25° C. with water as the reaction medium. By replacing the water at least partly with acetone, or acetonitrile, in which the tertiary amines and allyl halides are miscible, the reaction rate is materially increased.

The preferred method of preparing the allyl quaternary ammonium intermediate avoids any purification of the intermediate. For example, the quaternization of trimethyl amine, in water solution with allyl chloride is substantially complete in a few hours at 25° C. No purification of the crude reaction product is required if a slight stoichiometric excess of amine (e.g. 1.5–7%) is employed. Unreacted allyl chloride in the intermediate is negligible because of the completeness of reaction. Further, the quaternization reaction is so rapid, that no sizeable concentration of side reaction products form, which can effect the ultimate use of the derivative in preparing the desired quaternary ammonium ether of starch. Presence of a small proportion of amine during the hypohalogenation step or in the starch etherification step has no deleterious effect on the desired final product. If desired, however, the excess amine may be recovered or removed by known means prior to hypohalogenation.

A somewhat less desirable method entails the use of an equivalent amount or slight stoichiometric excess of allyl halide. However, under these conditions it is necessary to make sure the reaction product is substantially free of excess unreacted allyl halide and its hydrolysis product, allyl alcohol. The allyl halide concentration should be less than 0.05% by weight of the allyl quaternary ammonium halide, when the allyl halide is the chloride. Slightly higher concentrations of allyl bromide and allyl iodide can be tolerated because of the higher molecular weight of these halogens. The allyl alcohol concentration should be less than 0.3% by weight of the allyl quarternary ammonium halide. Failure to take this precaution can result in the formation of an undesirably high concentration of deleterious by-products, which cannot be tolerated in the starch etherification reaction. These by-products belong to the class of bifunctional starch cross-linkers described by Konigsberg and operate in the manner described by Konigsberg.

The intermediate allyl quarternary ammonium halide can be made substantially free of excess allyl alcohol and/or allyl chloride prior to the hypohalogenation step easily and inexpensively. The preferred method of purification is steam distillation, e.g. by distillation of a portion of the water in which the allyl quaternary compound is usually dispersed. Another method of purification is extraction of allyl halide and allyl alcohol from the allyl quaternary compound, in water solution for example, with a selective solvent, e.g. dimethyl ether. Other methods of purification e.g. differential absorption in a finely divided solid material, aeration with an inert gas, and crystallization of the allyl quaternary compound from solution in water or other solvent, will be obvious to those skilled in the art.

While removal of allyl chloride and allyl alcohol is relatively easy and inexpensive, it is preferable, as pointed out above, to carry out the preparation of the allyl quaternary ammonium compound under conditions (i.e. stoichiometric excess of tertiary amine) which do not require this step in order to prepare a salt substantially free of excess allyl halide and allyl alcohol.

Because of it greater reactivity and lower cost per equivalent weight, hypochlorous acid is the preferred hypohalous acid for converting the allyl quaternary ammonium salt to the corresponding vicinal halohydroxypropyl derivative. The preferred method of providing hypochlorous acid is to mix chlorine and water with the allyl quaternary compound present. A small proportion of the dissolved chlorine reacts with water to form hypochlorous and hydrochloric acids according to the equilibrium reaction $Cl_2+H_2O \rightarrow HOCl+HCl$. The direct addition of chlorine to the aqueous solution of the allyl quaternary salt is a more convenient and less expensive method than (1) preparing hypochlorous acid separately in water solution or (2) acidifying hypochlorite solutions derived from chlorine and alkali.

The preferred method of providing hypochlorous acid is conveniently applicable to preparation of all the quaternary ammonium etherifying products encompassed by our invention because all the intermediate allyl quarternary ammonium salts, except those containing a long carbon chain, are readily soluble in water. For example, 25% by weight solution of the allyl intermediates are smoothly and rapidly converted to the desired chlorohydroxypropyl compound by passing chlorine into the rapidly stirred aqueous solution. Rate of chlorine absorption varies directly with amount of liquid-gas interface area and it thus increases with increasing degree of chlorine dispersion within the solution, e.g., by increased rate of stirring. The reaction is strongly exothermic and liberates enough heat to raise the temperature of the reaction mixture from 20° C. initially to about 100° C. unless the heat is removed. As the reaction proceeds, hydrochloric acid accumulates in the reaction mixture equivalent approximately to the hypochlorous acid consumed. Neither development of strong acidity nor uncontrolled heating materially lowers the quality of the reaction product. Corrosiveness of the reaction solution may be reduced, if desired, by partially neutralizing the hydrochloric acid as it is formed and preferably keeping the pH in the range of 1–3. Calcium carbonate is conveniently adaptable to this purpose because an excess does not yield an alkaline pH. The pH range of 1–3 is also desirable for, in this range, the reaction rate is increased.

Alternative methods of making hypochlorous acid referred to above are described in the chemical literature. Preparation of a crude water solution of hypochlorous acid by acidification of aqueous hypochlorite derived from chlorine and aqueous sodium hydroxide is described at pages 151–152 in Collective Volume 1 of "Organic Syntheses" published by John Wiley and Sons, New York, N.Y. (1932). Isolation of hypochlorous acid as a dilute water solution by vacuum distilling the solution obtained by passing chlorine into a stirred suspension of freshly precipitated mercuric oxide in water is described, pages 244–245, volume 2 of "A Comprehensive Treatise on Inorganic and Theoretical Chemistry" edited by J. W. Mellor and published by Longmans, Green and Company, New York, N.Y. (new impression, 1956). Still another method of preparing a water solution of hypochlorous acid is described at pages 156–161, in volume 5 of "Inorganic Syntheses" published by McGraw-Hill Book Company, Inc., New York, N.Y., 1957.

Aqueous hypobromous acid is readily prepared by stirring for 30 minutes at 5° C. a mixture of 15 parts by weight of yellow mercuric oxide, 400 parts by weight of water and 18 parts by weight of bromine, then filtering from insoluble mercury salt. The neutral, light yellow, faintly acidic filtrate assays about 0.27 normal hypobromous acid by iodometric titration, and is stable for several hours at 3–5° C.

To prepare the starch ethers according to our invention, starch, quaternary ammonium etherifying reagent and alkaline catalyst are brought together. The reaction mixture must be alkaline for the etherification reaction to proceed, but the permissible range of alkaline pH is broad. Rate of starch etherification at 45° C. with the preferred reagent, viechlorhydroxypropyl trimethylammonium chloride, is appreciable at 9.5 pH and increases with increasing pH. We have found that the vicinal halohydroxypropyl quaternary ammonium halide is converted to the corresponding epoxide at a rate actually much greater, at a given alkaline pH, than that of the starch etherification reaction. Preferred pH of etherification will vary with circumstances, depending to a large extent upon the desired nature of the starch ether, and will usually represent a compromise between desired etherification catalysis and undesired side reactions at high pH. For example, 10.5–11.5 pH is the preferred range when the starch ethers are to be prepared in original granule form, using water as reaction medium. At reaction pH values above 11.5, under these circumstances, there is a tendency for the granules to swell undesirably, even at 40° C. and auto-oxidation of the starch may lead to a product with greatly reduced hot-water-paste viscosity. The auto-oxidation, however, can be supressed by excluding air. On the other hand, a pH in the range of 12–13 may be preferred when starch, in pasted or gelatinized form, is etherified to high degree of substitution to obtain a product useful for flocculating materials suspended in aqueous systems. Here, the high pH is desired to promote the etherification, and the attending auto-oxidation of the starch product does not appear to be very disadvantageous.

A wide variety of alkaline compounds may be used as catalysts in our improved process. These include (1) hydroxides, alcoholates and weak-acid salts of the alkali metals, (2) the oxides and hydroxides of calcium, barium and strontium, and (3) quaternary ammonium bases. Specific examples of alkaline compounds suitable as catalysts in our invention are sodium hydroxide, potassium hydroxide, lithium hydroxide, calcium oxide, calcium hydroxide, barium hydroxide, strontium hydroxide, trimethylbenzyl ammonium hydroxide, sodium methylate, sodium aluminate, trisodium phosphate and sodium silicate.

Temperature of the etherification reaction may be as low as 10° C. or as high as 200° C. As a rule, reaction time varies inversely with reaction temperature. For example, the ether can be prepared by heating starch, reagent, alkaline catalyst and suitable plasticizer, e.g., water, under conditions of severe working as in a plastics extruder as disclosed in U.S. Patent 3,137,592, filed Apr. 3, 1961. With this method, the reaction temperature can range from 150–200° C. and the reaction time, i.e., the extruder retention time, can be as short as 1 to 2 minutes. Much lower temperatures are required if the starch ether is to be recovered in original granule form from water as reaction medium. To avoid undesirable swelling of the starch granules during such etherification, the reaction temperature is preferably kept about 30° C. below the swelling or gelatinization temperature of the original starch. Thus 40–45° C. is a satisfactory reaction temperature range for the preparation of ungelatinized quaternary ammonium ethers of common corn starch by water slurry reaction. Reaction temperature in the 50–100° C. range may be advantageously used in aqueous paste etherifications or in original granule etherifications when the reaction medium is chosen to suppress gelatinization or swelling. Examples of reaction media which inhibit starch granule swelling are water solutions of selected inorganic salts, e.g., sodium chloride, sodium sulfate, sodium carbonate, magnesium sulfate, and organic liquids, e.g., lower alcohols and dioxane.

As indicated above, the proportion of reaction medium for the etherification reaction can vary widely. In the extruder method, for example, water may be the reaction medium and plasticizer, at a proportion of 25 parts by weight, for example, per 100 parts by weight of dry substance starch. In the preparation of ungelatinized ethers by slurry reaction, the proportion of reaction medium (e.g., water, aqueous salt solution, lower alcohol) may be as small as 125 mls. per 100 gms. of starch but preferably will be larger, e.g., 200 mls. per 100 gms. of starch. Still larger proportions of reaction medium, e.g., 10 to 20 mls. per gram of starch, may be required in the paste etherifications because of viscosity effects. Although water is the preferred medium for paste etherification, other liquids, e.g., dimethylsulfoxide, may be used.

The etherification reaction may also be performed on granular starch in the superficially dry condition. For example, ungelatinized starch containing 20% moisture may be tumbled and heated with finely divided sodium methylate and finely divided crystalline chlorohydroxypropyl trimethyl ammonium chloride to yield an ungelatinized cationic starch ether. Generally, more than 10% water is required.

Our invention is applicable to all starches and starch fractions, including dextrins and the waxy and high-amylose starches. If the starch is of vegetable origin, it may be derived from root (e.g., potato, tapioca), stem (e.g., sago) or seed (e.g., the cereals, corn, wheat, rice) of the plant. The starch may have been modified beforehand, in paste or granule form, with acids, enzymes, heat or oxidizing agents. In the case of oxidizing agents, carboxyl groups are introduced and these being anionic, tend to diminish the cationic activity of the quaternary starch derivative. Also the starch or dextrin may have been partially derivatized beforehand as, for example, by reaction with acetic anhydride or with vinyl acetate to form the starch ester of acetic acid or by reaction with ethylene oxide to form the hydroxyethyl ether of starch. The important requirement is that the starch have reactive hydroxy groups.

The cationic starch derivatives prepared by the method of this invention can be used as additives to the wet end of a paper machine to increase internal bonding and strength of the paper and to assist in retaining filler in the paper. These derivatives can also be used as flocculating agents in mineral suspensions, especially anionic suspensions, and as sizing agents for textiles or for yarn prior to weaving.

Our invention is illustrated by the following examples which are typical and informative but not limiting.

*Example 1*

This example illustrates the preparation of a quaternary ammonium etherifying reagent made from trimethylamine, allyl chloride and chlorine water and of an ungelatinized cationic ether of corn starch made therefrom in water slurry.

A mixture of 82 ml. (77 g., 1 mol) of allyl chloride and 250 ml. of water was charged into a 1000 ml. 3-neck round bottom flask equipped with thermometer, separatory funnel, reflux condenser and mechanical stirrer. The stirrer was started, and 236 g. of 25% by weight trimethylamine solution in water (59 g. trimethylamine, 1 mol) was added gradually through the separatory funnel in about one hour to maintain a gentle reflux of allyl chloride at 43–45° C. After the addition of trimethylamine solution was complete, stirring was continued for one hour, and then the reaction solution was vacuum distilled at 30–35° C. to remove about 100 ml. of water. The distillation stripped out all unreacted allyl chloride and all allyl alcohol formed by hydrolysis of the allyl chloride. At this point the reaction solution was slightly alkaline to litmus paper and contained 0.986 equivalent of halide ion by Volhard titration with standard silver nitrate solution.

The reaction solution of allyl trimethylammonium chloride was diluted with water to 800 ml. and stirred rapidly while chlorine gas was passed into it through a tube leading to the bottom of the flask. Chlorine absorption was rapid and solution temperature rose steadily with the absorption. Rate of chlorine absorption varied directly with rate of stirring. The characteristic yellow-green color of chlorine gas was present in the free space above the stirred solution, but the solution remained colorless until the end of the reaction. End of the hypochlorination, 40 minutes after beginning, was signalled by (1) an abrupt change in solution color from colorless to yellow-green, (2) by a peak in solution temperature, and (3) by an abrupt increase in oxidizing power of the solution as measured by release of iodine from sodium iodide—hydrochloric acid solution. The reaction solution temperature rose from 24° C. to 69° C. and 72.5 g. of chlorine was absorbed. Air was sparged through the hot solution for a few minutes to remove dissolved chlorine. Residual oxidizing power of the solution, presumably hypochlorous acid, was eliminated by stirring in anhydrous sodium sulfite (0.45 g.). At this stage, the solution contained 0.768 equivalent of acidity, 1.730 equivalents of halide ion, and an additional 0.970 equivalent of halide ion releasable with lime, as determined by warming an aliquot of the solution with excess lime for 30 minutes at 50° C. Warming with lime in this way converts the chlorhydrin to the epoxide. The hypochlorination solution was transferred to another vessel and diluted to 1000 ml. with water.

One hundred ml. of the diluted hypochlorination solution was returned to the 1000 ml. reaction flask. To the flask was then added with stirring 200 ml. of water, 200 g. of corn starch (11.5% moisture), and 10 g. of hydrated lime. Temperature of the starch slurry was brought to 45° C. and held there. One hour later, pH of the slurry was 11.1. Fifty ml. samples were withdrawn at 6 and 12 hours reaction time, neutralized to about 5 pH with hydrochloric acid and filtered. The starch cakes were washed with water and dried at room temperature. Twenty-four hours later, the remainder of the slurry was neutralized to about 5 pH with HCl, and the granular, unswollen starch was recovered by filtration and dried. pH of the final reaction slurry, prior to neutralization, was 10.8. Nitrogen contents of the starch products, all containing about 9.5% moisture, were 0.23%, 0.30% and 0.32% at 6 hrs., 12 hrs., and 24 hrs., respectively. All yielded pastes with 50 parts of water at 95° C. that were markedly more viscous and clearer than a control paste of the original starch. When diluted with 3 volumes of water and allowed to stand 24 hours at 25° C., the pastes showed no signs of settling or separating into sediment and supernatant phases. Nor did the diluted pastes (about 0.5% solids) show any separation when centrifuged for 5 minutes at 350 gravities. The presence of a sediment under these conditions would indicate that the granular starch derivative was at least partly inhibited to pasting. By contrast, the equally diluted control paste separated into a cloudy sediment layer and a clear supernatant layer when centrifuged the same way. Furthermore, all three lots of the starch product were observed to be strongly cationic to Light Green SF dye, i.e., when suspensions of 0.2 g. of the dry ungelatinized starch ether in 10 ml. of water were mixed with 10 drops each of a 0.2% water solution of the dye and centrifuged, the settled starch was dark green and the supernatant water was almost colorless. A control dye test on the original starch gave a white starch layer and a dark green supernatant water layer.

The 24 hr.-reacted cationic starch ether was compared with its parent starch and with a commercially available cationic corn starch as a filler-retention aid in a standardized laboratory test in hand-made sheets of paper. The starches were pasted in hot tap water (93–95° C.) at 0.9% starch dry substance for 30 minutes accompanied by uniform moderate mechanical stirring. The paper furnish contained 12% titanium dioxide filler and 0.5% starch dry substance based on the pulp dry substance. The stock pulp, after beating, contained 2% rosin and about 1.6% alum based on dry pulp. Both "acid" and "alkaline" hand sheets were made. In the "acid" sheets, the pH of the furnish was adjusted to 5.0–5.5 pH with dilute hydrochloric acid, and in the "alkaline" sheets no pH adjustment was required because the local water supply was alkaline enough to yield furnish at 8–9 pH. Weighed portions of the dry hand sheets were ashed by a standard procedure to determine total ash content and from this value, after correction for ash in the unfilled sheet, was calculated the percent of original filler retained by the paper. The following results (averages of triplicate sets of hand sheets) were obtained:

| Starch | Percent Filler Retained in the "Acid" Sheet | Percent Filler Retained in the "Alkaline" Sheet |
|---|---|---|
| None (control) | 50.6 | 35.1 |
| 24 hour-reacted | 71.7 | 78.1 |
| Commercial cationic | 72.4 | 76.3 |

*Example 2*

This example illustrates the effect of residual allyl chloride on the preparation of cationic corn starch ether.

Preparation of quaternary ammonium etherifying reagent as described in Example 1 was repeated except that (1) the amount of allyl chloride was increased to 85 ml. and (2) the vacuum distillation of the quaternary reaction product was omitted. The final quaternization reaction solution was neutral to litmus and smelled rather strongly of allyl chloride. Corn starch was etherified with the hypochlorinated product as described in Example 1, taking only one sample after 24 hours. The starch ether was strongly cationic to Light Green SF dye and contained 0.31% nitrogen. When heated with 50 parts of water at 95° C., the starch ether gave a thin cloudy paste. When this paste was diluted with 3 volumes of water and allowed to stand, the diluted paste quickly separated into a cloudy sediment layer and a clear supernatant water layer. In a filler retention test on "acid" hand sheets of paper (pH of furnish around 5), the product showed almost no improvement over the control, the numbers being 53.6% retention for control, 55.2% retention for the inhibited cationic starch ether of this example and 72.8% retention for another sample of the 24-hour reaction product in Example 1.

*Example 3*

This example illustrates the preparation of a quaternary ammonium etherifying reagent from an unpurified quaternization reaction product obtained by reacting allyl chloride with a stoichiometric excess of trimethylamine in water solution and of an ungelatinized cationic corn starch ether with sodium hydroxide catalyst.

Preparation of quaternary ammonium etherifying reagent as described in Example 1 was repeated except that (1) the amount of trimethylamine solution was increased from 236 g. to 248 g., (2) the additional stirring time in the quaternization step (after all the trimethylamine solution had been added to the allyl chloride) was increased from 1 hour to 2 hours, and (3) the vacuum distillation to purify the crude quaternization reaction solution was omitted. The solution prior to hypochlorination contained 0.053 equivalent of amine (by titration with standard alkali) and 0.983 equivalent of chloride ion. Corn starch was etherified with the hypochlorinated solution, as described in Example 1, except (1) the line was replaced with 10.6 g. of sodium hydroxide, (2) all the water, reagent solution and sodium hydroxide were mixed and held 30 minutes at 45° C. before stirring in the starch, and (3) only one sample was prepared with 24-hour reaction time. The washed and dried starch ether was strongly cationic to Light Green SF dye and contained 0.31% N at 9.3% moisture. Its hot water paste properties and filler retention performance in hand sheets were substantially the same as those of the starch ether made in Example 1 at 24 hours reaction time.

*Example 4*

This example illustrates the preparation of a quaternary ammonium etherifying reagent made from triethylamine and of an ungelatinized cationic corn starch ether therefrom.

Triethylamine (300 ml., 216 g.) and allyl chloride (170 ml., 160 g.) were mixed with 200 mls. of acetonitrile at room temperature in a closed 1000 ml. flask and allowed to stand 3 days. An interlocking mass of large colorless prismatic crystals grew slowly on the bottom of the flask and eventually occupied nearly one half the volume of the reaction mixture. The mother liquor was drained from the crystals and the latter, after being loosened from the wall and bottom of the flask with a rod, were washed on a Buchner funnel with three 100 ml. portions of a mixture of 90 ml. ethyl acetate and 10 ml. ethanol. The crystals were dried on the funnel by sucking dry air through them for one hour. Yield of product, deliquescent in air at 40% relative humidity, was 270 g. Halide equivalent weight (grams per gram molecule of ionic halogen) by titration with starch silver nitrate was 180 (178 calculated for allyl triethylammonium chloride).

The allyl triethylammonium chloride was hypochlorinated with chlorine water essentially according to the method of Example 1. The solution weight increase was 70 g. at the end point of chlorine absorption. After aeration and addition of sulfite, the reaction solution contained 0.727 equivalent of acidity and 1.758 equivalents of halide ion. One half of the reaction solution (435 g.) was vacuum evaporated to a thick sirup in order to remove hydrochloric acid and then diluted to 400 g. with water. The acidity and halide ion contents were 0.126 and 0.642 equivalent, respectively.

A slurry of 92 g. of corn starch (11% moisture), 100 mls. of water, 40 g. of the diluted hypochlorination product and 5 g. of lime was stirred slowly for 12 hours at 50° C. and pH 11.0–10.8. The reaction slurry was then neutralized to about 5 pH with 6 N hydrochloric acid and filtered by vacuum. The starch cake was washed with water and dried at room temperature. The dried product, superficially indistinguishable from its parent starch, contained 0.30% nitrogen at 9.5% moisture and was strongly cationic to Light Green SF dye. Its 2% paste in water at 95° C. was clear and much thicker than a control paste of the parent starch. When the 2% paste was diluted to 0.5% with water and centrifuged for 5 minutes at 350 gravities no sedimentation occurred.

*Example 5*

This example illustrates the preparation of an ungelatinized cationic starch ether of waxy maize starch using sodium hydroxide catalyst and a quaternary ammonium etherifying reagent made from triethylamine, allyl bromide and chlorine water.

A mixture of 100 ml. (72 g.) of triethylamine and 150 ml. of acetonitrile was placed in a 1000 ml. 3-neck round bottom flask equipped with mechanical stirrer, reflux condenser, thermometer and heating mantle. Allyl bromide (60 mls., 84 g.) was added gradually through the reflux condenser to the stirred mixture at such rate that gentle refluxing occurred at 75–80° C. Stirring and heating to maintain reflux was continued for 30 minutes after all the allyl bromide was added. Ethyl acetate (300 ml.) was then slowly added to the refluxing mixture to precipitate the quaternary ammonium salt. The white crystalline product was collected on a suction filter, washed with 100 ml. of cold acetone and dried to constant weight in a vacuum oven at 60° C. Yield, 135 g. of product with halide equivalent weight of 226. Calculated halide equivalent weight for allyl triethylammonium bromide is 222.

A solution of 45 g. of the crystalline allyl triethylammonium bromide in 1000 ml. of water was heated to 80° C. and placed in a 2000 ml. 3-neck round bottom flask equipped with mechanical stirrer, gas-inlet tube leading to the bottom of the flask and a gas outlet. Chlorine gas was passed into the rapidly stirred solution at the rate of about 1 g. per 5 minutes. Bromine color appeared immediately and remained for about 40 minutes when it abruptly disappeared. About 15 minutes later, the hypochlorination end-point was reached. Chlorine flow was stopped and air was passed through the warm and rapidly stirred solution for 15 minutes to remove oxidizing substances. At this stage, the essentially colorless reaction solution contained 0.114 equivalent of acid and 0.282 equivalent of halide ion. When an aliquot was heated 30 minutes at 65° C. with excess lime, the calculated total halide ion content increased to 0.484 equivalent.

This product (200 ml.) was warmed with 4.0 g. of sodium hydroxide to 55° C., held there with stirring for 30 minutes, then cooled to 30° C. Waxy maize starch (100 g.) was rapidly added to the stirred solution to yield a fluid slurry at 11.3 pH. This slurry was then warmed to 47° C. and held there with gentle stirring for 24 hours. Starch reaction product was recovered by neutralizing the slurry with hydrochloric acid, filtering, washing the cake with water and drying it at room temperature. The dry starch ether, containing 0.22% nitrogen and 7.8% moisture, was strongly cationic to Light Green SF dye and gave a clear sirupy 0.5% paste in hot water that was stable to 5 minutes centrifuging at 350 gravities.

*Example 6*

This example illustrates the use of an acidified bleach solution (sodium hypochlorite) in the place of chlorine in water. Triethylamine was used as the tertiary amine.

Crystalline allyl triethylammonium chloride (90 g.), prepared as described in Example 4, and a mixture of 5.4 ml. of 37% aqueous hydrochloric acid and 100 ml. of water were placed in a 1000 ml. 3-neck flask equipped with ice bath, mechanical stirrer, thermometer and seporatory funnel for addition of liquids. When the temperature of the stirred mixture reached 5° C., 50 ml. of commercial bleach solution containing 5.25% by weight of sodium hypochlorite was added gradually to the flask in about 5 minutes. Temperature of the stirred mixture rose to 9° C. A few drops of the reaction solution, acid to litmus paper, liberated no iodine from 1 ml. of 1 N aqueous sodium iodide solution. Another 5.4 ml. of 37% hydrochloric acid was added, the solution was cooled to 6° C. and another 50 ml. of the bleach solution was added over a 5 minute period. Alternate additions of hydrochloric acid and bleach were continued in this manner until the total volumes of acid and bleach were 70 ml. and 650 ml. respectively, and the reaction solution gave a persistent iodine test for the presence of oxidizing substance. The oxidant present was reduced with 1.5 g. of sodium sulfite and the acidity of the solution was neutralized with 20 ml. of 10% aqueous sodium hydroxide solution. The reaction product was dehydrated, using vacuum distillation at 40–50° C. followed by azeotropic distillation with n-butanol. The slurry of crystalline sodium chloride in the butanol solution of quaternary ammonium salt (300 ml.) was diluted with 100 ml. ethanol and filtered. The NaCl filter cake was washed with ethanol and the washings were combined with the main filtrate. The butanol-ethanol solution was vacuum evaporated to a glassy product weighing 120 g. Halide equivalent weight of the glassy material was 245; calculated value for chlorohydroxypropyl triethylammonium chloride is 230.

A slurry of 80 g. of corn starch and 4 g. of lime in a solution of 8.56 g. of the glassy reaction product in 160 ml. water was stirred slowly at 47° C. for 18 hours. Initial and final pH values of the slurry were 11.0 and 10.8 respectively. The alkaline slurry was neutralized with hydrochloric acid and filtered. The starch filter cake was washed with water and dried at room temperature. The dry starch reaction product was strongly cationic to Light Green SF dye, contained 0.26% nitrogen at 9.7% moisture, and gave a clear sirupy paste with 200 parts by weight of water at 95° C. which showed no sedimentation when centrifuged 5 minutes at 350 gravities.

*Example 7*

This example illustrates the preparation and use of a quaternary ammonium etherifying reagent made from tri-n-butylamine, allyl bromide, silver chloride and chlorine water.

Two hundred ml. of a 1.0 molar solution of allyl bromide in acetone was mixed with 200 ml. of a 1.0 molar solution of tri-n-butylamine in acetone and allowed to stand 24 hours at room temperature. Evaporation of acetone from the mixture by heating on a steam bath yielded a viscous yellow sirup. The sirup was dissolved to a cloudy solution in 500 ml. water, evaporated to 400 ml. on a hot plate to remove residual allyl bromide, cooled to 30° C., then stirred rapidly with 0.5 mol of washed freshly precipitated silver chloride for 15 minutes, then filtered to obtain a solution of the quaternary ammonium chloride salt. The yellow filter cake, a mixture of silver chloride and silver bromide, was washed with water until the combined filtrate and wash amounted to 1000 ml. The 1000 ml. solution of allyl tri-n-butyl ammonium chloride was then hypochlorinated with chlorine as described in Example 1 to produce the chlorhydrin.

After aeration and treatment of the whole solution with 0.5 g. sodium sulfite to remove oxidizing substances, one-fifth of the chlorhydrin solution was mixed with 100 g. of corn starch and enough lime (4.0 g.) to provide a slurry pH of 11.1 after 1 hour stirring at 43° C. Stirring was continued for 24 hours at 43° C. The etherified ungelatinized starch product was recovered as described previously. The dried product, strongly cationic to Light Green SF dye, contained 9.3% moisture and 0.21% nitrogen. Its 0.5% paste in water at 95° C. was clear, sirupy and stable to centrifuging for 5 minutes at 350 gravities.

*Example 8*

This example illustrates the preparation of a quaternary ammonium etherifying reagent made from N,N-dimethylbenzylamine and allyl bromide and of an ungelatinized corn starch ether.

The procedure of Example 7 was repeated except for replacing the tri-n-butylamine (0.2 mol) with N,N-dimethylbenzylamine (0.2 mol). The washed and dried starch ether was strongly cationic to Light Green SF dye and contained 0.28% nitrogen at 8.8% moisture. Its 0.5% paste in water at 95° C. was clear and sirupy and stable to centrifuging for 5 minutes at 350 gravities.

*Example 9*

The procedure of Example 7 was repeated except for replacing the tri-n-butylamine (0.2 mol) with N,N-dimethylcyclohexylamine (0.2 mol). The washed and dried starch ether, containing 9.1% moisture and 0.19% nitrogen, was strongly cationic to Light Green SF dye. Its 0.5% paste in water at 95° C. was clear, sirupy and stable to centrifuging for 5 minutes at 350 gravities.

*Example 10*

The procedure of Example 7 was repeated except for replacing the tri-n-butylamine (0.2 mol) with N-methyl morpholine (0.2 mol). The washed and dried starch product, containing 8.9% moisture and 0.25% nitrogen, was strongly cationic to Light Green SF dye. Its 0.5% hot water paste was clear, sirupy and stable to centrifuging for 5 minutes at 350 gravities.

*Example 11*

The procedure of Example 7 was repeated except for replacing the tri-n-butylamine (0.2 mol) with dimethylaniline (0.2 mol). The washed and dried starch product, containing 8.6% moisture and 0.22% nitrogen, was strongly cationic to Light Green SF dye. Its 0.5% paste in hot water was clear and sirupy and stable to 5 minutes centrifuging at 350 gravities.

*Example 12*

The procedure of Example 7 was repeated, replacing the tri-n-butylamine (0.2 mol) with N-methylpiperidine (0.2 mol), and the results were similar.

*Example 13*

The procedure of Example 7 was repeated except for replacing the tri-n-butylamine (0.2 mol) with N-methylpyrrolidine (0.2 mol). The washed and dried starch reaction product, containing 8.7% moisture and 0.30% nitrogen, was strongly cationic to Light Green SF Dye. Its 0.5% paste in hot water was clear and sirupy and stable to 5 minutes centrifuging at 350 gravities.

*Example 14*

This examples illustrates the use of allyl iodide as the allyl halide.

A solution of 16 g. of allyl chloride in 150 ml. of acetone was refluxed 30 minutes with 30 g. of sodium iodide and filtered from precipitated sodium chloride. The filter cake was washed with enough acetone to make the combinted filtrate and wash amount to 200 ml. The procedure of Example 7 was then repeated, substituting the 200 ml. acetone solution of allyl iodide for the 200 ml. acetone solution of allyl bromide. The washed and dried starch product, containing 8.5% moisture and 0.28% nitrogen, was strongly cationic to Light Green SF dye. Its 0.5% paste in water at 95° C. was clear and sirupy and stable to 5 minutes centrifuging at 350 gravities.

*Example 15*

This example illustrates the preparation of a cationic starch ether by reacting corn amylopectin in water dispersion with sodium hydroxide catalyst and a quaternary ammonium etherifying reagent made as described in Example 1.

Spray-dried corn amylopectin (100 g.) was slurried with 150 ml. of methanol then quickly mixed with 650 ml. of water to form a viscous paste. To this was added 100 ml. of diluted etherifying reagent solution prepared as described in Example 1 and enough 50% sodium hydroxide solution (11.0 ml.) to give a paste pH of 11.3 after it was warmed to 50° C. and held at that temperature for 1 hour. The fluid paste was transferred to a 1000 ml. 3-neck round bottom flask equipped with mechanical stirrer, thermometer and heating mantle and stirred slowly for 22 hours at 50° C. At the end of this time, the pH had dropped to 11.1. The clear fluid paste was diluted with 1000 ml. water, neutralized to about 5 pH with hydrochloric acid, and rapidly mixed with 2000 ml. of ethanol. The gummy precipitated product was mixed with 1500 ml. of 70% by weight ethanol for 30 minutes, yielding a coherent mass weighing 190 g., than transferred to 1500 ml. anhydrous methanol for dehydration and hardening. The white, granular, friable product thus obtained was dried to constant weight of 94 g. at room temperature of about 25° C. It was strongly cationic to Light Green SF dye in aqueous ethanol suspension and contained 0.48% of nitrogen at 9.1% moisture.

*Example 16*

This example illustrates the use of high-amylose corn starch.

A water solution of quaternary ammonium etherifying reagent, prepared as described in Example 1, was vacuum evaporated to a heavy sirup, then dehydrated to a granular solid state by azeotropic distillation with n-butanol. The resultant slurry of white crystalline material in butanol was heated on a steam bath under vacuum to remove as much butanol as possible, mixed with 100 ml. methanol and heated to 85° C. to form a clear solution, then mixed quickly with 3000 ml. of hot ethyl acetate to provide an immediate copious crystalline precipitate. The slurry was stirred slowly for 24 hours while being cooled to room temperature. The crystalline product, deliquescent in humid air, was quickly filtered and washed with acetone, then dried in an oven at 115° C. the yield was 185 g. with a halide equivalent weight of 193. This value indicates that the product is a mixture of 0.7 mol of the chlorohydroxypropyl compound and 0.3 mol of the dichloropropyl quaternary ammonium salt $(0.7 \times 187.5 + 0.3 \times 206 = 193)$; the dichloro compound being formed by addition of chlorine to the allyl trimethyl ammonium chloride. The dichloro compound is quite unreactive with starch, as illustrated hereafter in Example 26.

In a 1000 ml. 3-neck round bottom flask equipped with mechanical stirrer, thermometer and heating mantle were placed 600 ml. of water, 300 g. of 55%-amylose corn starch, 85 g. of the above prepared crystalline etherifying reagent and 20 g. of lime. The gently stirred mixture was warmed to 45° C. and held at that temperature. After 1 hour, the slurry pH was 11.1. After 24 hours, the slurry pH had dropped to 10.9. The fluid reaction mixture was then neutralized to about 5 pH with hydrochloric acid and filtered. Filtration was slow but steady. The 0.5 inch thick filter cake was washed with water and dried at room temperature. The dry product, in the form of its parent starch, was strongly cationic to Light Green SF dye and contained 0.90% nitrogen at 9.5% moisture. Its 2% paste in water at 95° C. was cloudy but viscous, and when diluted to 0.5% and centrifuged for 5 minutes at 350 gravities the diluted paste did not separate into layers or yield a significant sediment.

*Example 17*

This example illustrates the preparation of an ungelantinized cationic starch ether by reacting an acid-modified corn starch in alcohol slurry with sodium hydroxide catalyst.

In a 500 ml. 3-neck round bottom flask equipped with mechanical stirrer, thermometer and heating mantle were placed 150 g. acid-modified corn starch (5 g. alkali fluidity, 92 ml.), 200 ml. ethanol, 50 ml. water and 42 g. of crystalline etherifying reagent prepared as described in Example 16. To the vigorously stirred mixture was then slowly added 10 ml. of 50% sodium hydroxide solution in water. Stirring rate was reduced and temperature of the stirred slurry was raised to 70° C. and held at that value. Samples (25 ml.) were withdrawn at 0.5 hour, 1 hour, 2 hours, 4 hours and 8 hours, neutralized with hydrochloric acid and filtered. The filter cakes were washed with a mixture of 3 volumes of ethanol and 1 volume of water and dried at about 25° C. The balance was held for 19 hours and then recovered in the same may. Nitrogen contents of the products, in the order of sampling, were 0.47, 0.60, 0.78, 0.85, 0.92 and 0.92%. When 1 g. of each dried sample was stirred 5 minutes with 50 ml. of water at 25° C., the 0.5- and 1-hour samples gave mixtures which deposited pasty material on standing. The other samples gave stable and slightly cloudy 2% pastes which deposited no sediment when diluted to 0.5% and allowed to stand 24 hours at 25° C.

*Example 18*

This example illustrates the preparation of a cationic starch ether by reaction of corn amylose in water slurry.

In a 1000 ml. 3-neck round bottom flask equipped with mechanical stirrer, thermometer and heating mantle were placed 960 g. of a thick slurry of corn amylose in water containing 11% by weight amylose, a solution of 40 ml. of water and 30 g. crystalline etherifying reagent, prepared as described in Example 16, and enough lime (7.1 g.) to provide a slurry pH of 11.2 after 1 hour heating at 50° C. Stirring and heating at 50° C. were continued for a total of 24 hours. The reaction mixture was neutralized with hydrochloric acid to about 3 pH, mixed with 2500 ml. ethanol to coagulate the amylose reaction product, heated to 75° C. and filtered. The filter cake was washed with ethanol, then with acetone and dried at about 25° C. The white, friable solid product contained 0.60% nitrogen and 8.2% moisture. It was strongly cationic to Light Green SF dye, when suspended in a mixture of 2 volumes of ethanol and 1 volume of water, and gave a cloudy but stable and sirupy paste at 0.5% solids in hot water.

*Example 19*

This example illustrates the preparation of a gelatinized cationic starch ether by reacting a water paste of waxy maize starch.

In a 1000 ml. 3-neck round bottom flask were placed 750 ml. of water, 100 g. of waxy maize starch, 100 ml. of diluted reagent solution, prepared as described in Example 1, and enough 50% aqueous sodium hydroxide solution (15 ml.) to provide a pH of 11.8 after the mixture had stood 1 hour at 55° C. and had changed into a clear gelatinous paste. The flask was stoppered and stored for 18 hours in an oven at 65° C. The clear, light brown, viscous reaction mixture was diluted with 1000 ml. of water, neutralized to 5 pH with hydrochloric acid, then mixed with 2000 ml. of ethanol to coagulate the starch reaction product. The coagulated product was squeezed to remove liquor and then kneaded with a mixture of 1000 ml. ethanol and 250 ml. water to remove mother liquor and salt. This was transferred to 1500 ml. of anhydrous methanol. The white friable solid thus obtained, was ground under methanol in a mortar, filtered, washed with methanol, then with acetone and dried at about 25° C. The dried starch ether, containing 0.37% nitrogen and 9.2% moisture, dissolved readily in 200 parts by weight of water at 25° C. to form a slightly cloudy but sirupy paste that was stable to 5 minutes centrifuging at 350 gravities. It also adsorbed Light Green SF dye strongly from a dilute solution of the dye in 75% ethanol and was an efficient flocculation agent for bentonite clay suspended in saturated aqueous sodium chloride solution. Time required for 70 ml. of clear supernatant liquor to appear in the quiet suspension containing 0.5 ml. of a 0.5% hot water paste of ordinary unreacted waxy maize starch was observed to be 71 seconds; the corresponding time for a suspension containing 0.5 ml. of the 0.5% paste of the starch ether of this example was 45 seconds.

*Example 20*

This example illustrates the preparation of an ungelatinized cationic starch ether by reacting starch in the superfically dry state.

A superficially dry mixture of 180 g. of corn starch, 23 ml. of water, 9.8 g. of lime and 27 g. of crystalline etherifying reagent made as described in Example 16 was placed in a covered, jacketed, heavy-duty mixer and heated, with constant mixing, for 2.33 hours at 62–66° C. The granular product, which appeared dry in the visual and tactile sense, was transferred to a mixture of 300 ml. of methanol and 300 ml. of water (pH 11.1) and neutralized to about 3 pH with hydrochloric acid. It was recovered from the methanol-water slurry by filtration, wetting with methanol and drying at 45° C. in a vacuum oven. The starch reaction product contained 0.67% nitrogen and was strongly cationic to Light Green SF dye in aqueous ethanol. When mixed with 50 parts of water at 25° C., the slurry gradually thickened and formed an opalescent paste from which no material settled on prolonged standing. Heating the 2% paste to 75° C. reduced its viscosity and noticeably increased its clarity. When the heated 2% paste was diluted to 0.5% with water and centrifuged for 5 minutes at 350 gravities, no significant sedimentation occurred. The product was an efficient agent for the flocculation of a 2% bentonite clay suspension in saturated aqueous sodium chloride solution. Addition of 0.25 ml. of the 0.5% paste to 100 ml. of the bentonite suspension reduced flocculation time from 73 to 41 seconds.

*Example 21*

This example illustrates the preparation of a cationic starch ether by reacting corn amylopectin under conditions of vigorous working, as described in U.S. Patent 3,137,592, filed Apr. 3, 1961.

A crumbly mixture of 500 g. corn amylopectin (reduced viscosity, 1.44), 130 ml. of etherifying reagent solution (215 ml. of diluted reagent solution prepared according to Example 1 vacuum evaporated to 130 ml.) and 30 ml. of 50% aqueous sodium hydroxide solution was passed through a 1 inch plastics extruder at 130—150° C. with a retention time of about 1.5 minutes. pH of the light brown extruded product, pasted with 3 parts of water, was 10.7. A sample of the product, after 24-hour extraction with ethanol in a Soxhlet extractor and drying to constant weight in a vacuum oven at 60° C., contained 0.32% nitrogen and was strongly cationic to Light Green SF dye in aqueous ethanol. The granulated product dissolved readily in 50 parts of cold water to form a viscous hazy solution.

*Example 22*

This example illustrates the preparation of an ungelatinized cationic starch ether in which the starch is potato starch.

In a 500 ml. 3-neck round bottom flask equipped with mechanical stirrer, heating mantle and thermometer were placed 150 ml. of water, 112 g. of potato starch, 50 ml. of diluted etherifying reagent solution made according to Example 1 and 4.5 g. of lime. The mixture was heated to 42° C. under a nitrogen atmosphere and stirred gently at that temperature for 20 hours. Slurry pH values, after 1 and 20 hours, were 10.9 and 10.8 respectively. Ungelatinized starch ether was recovered by diluting the reaction slurry with an equal volume of ethanol, filtering the diluted slurry, washing the starch filter cake sequentially with 100 ml. of 5% aqueous acetic acid, 100 ml. of water and 200 ml. of acetone and drying the filter cake at room temperature. The dried product, containing 0.31% nitrogen and 9% moisture, was strongly cationic to Light Green SF dye and gave a clear sirupy paste in 200 parts by weight of water at 95° C. that was stable to centrifuging at 350 gravities for 5 minutes.

*Example 23*

This example illustrates the preparation of a cationic starch ether by reacting an ungelatinized cyanoethyl ether of corn starch in water slurry.

In the equipment described in the last example, 300 ml. of water, 100 g. of corn starch, 11.2 ml. of acrylonitrile and 1 g. of lime were stirred together for 7 hours at 38–40° C. and filtered. The starch cake was washed sequentially with water, dilute aqueous acetic acid, water and acetone, then dried in a vacuum oven at 60° C. The product contained 1.1% nitrogen and formed a cloudy but stable paste in 200 parts of water at 95° C.

The starch cyanoethyl ether (50 g.) was mixed in a 250 ml. flask with 75 g. of water, 50 ml. of diluted etherifying reagent solution, prepared as described in Example 1, and 3 g. of lime. The reaction slurry was heated at 42° C. and stirred slowly for 20 hours. Slurry pH was 10.2 after 1 hour of heating and 10.0 at the end of the reaction period. The thick slurry was neutralized with a 1.0:1:0:0.2 mixture of water, ethanol and glacial acetic acid. The reaction product was recovered by pouring the neutralized slurry slowly into two volumes of rapidly stirred ethanol and filtering off the white precipitated solid. The moist precipitate was extracted 18 hours with ethanol in a Soxhlet extractor, then dried at 60° C. in a vacuum oven. The dried material, containing 1.4% nitrogen, was strongly cationic to Light Green SF dye and gave a slightly cloudy but stable paste in 200 parts by weight of water at 95° C.

*Example 24*

This example illustrates the preparation of an ungelatinized cationic starch ether of tapioca starch and the use of aqueous hypochlorous acid prepared using mercuric iodide.

A water solution of hypochlorous acid containing dissolved mercury salt was prepared by passing chlorine into a cold (3–5° C.) stirred suspension of yellow mercuric oxide (22 g.) in 750 ml. of water until all the oxide dissolved. Weight of chlorine absorbed was 14.5 g. To the cold solution thus obtained was added 65 g. of a 44% by weight aqueous solution of allyl trimethylammonium chloride. Temperature of the cold hypochlorous acid solution rose to 10° C. and pH dropped from 8.8 to 6.0. The mixed solution, containing considerable suspended white fluffy crystalline material, was allowed to stand overnight (18 hours) and to come to room temperature. Then any residual oxidizing substance was reduced with 0.6 g. of sodium sulfite. The mercury was removed by adding sodium iodide in proportions to precipitate mercuric iodide until a sample of the solution yielded no mercuric oxide precipitate when made alkaline with sodium hydroxide. Filtration of the mixture and washing of the mercuric iodide filter cake gave 915 ml. of a colorless filtrate. This was vacuum evaporated to 700 ml. and analyzed for halide ion before and after lime treatment according to Example 1. The concentrate was found to contain 0.387 equivalent of halide ion before and 0.563 equivalent after the lime treatment.

Tapioca starch (100 g.) was mixed with 180 ml. of the foregoing etherifying reagent solution in a 500 ml. flask. Lime (3.0 g.) was added to the starch to provide a slurry pH of 11.0 pH after the slurry was heated to 47° C. and held at that temperature for one hour. The slurry was stirred gently at 47–48° C. for a total of 24 hours, and then neutralized from 10.8 to about 5 pH with hydrochloric acid. The starch reaction product was recovered by filtering the slurry, washing the starch cake with water and drying the cake at room temperature. The dried product, strongly cationic to Light Green SF dye and containing 0.29% nitrogen at 8.6% moisture, gave a clear viscous paste in 200 parts by weight of water at 95° C. which was stable to centrifuging for 5 minutes at 350 gravities.

*Example 25*

This example illustrates the preparation of an ungelatinized cationic rice starch ether.

In a 250 ml. flask were placed 60 ml. of water, 56 g. of rice starch, 21 ml. of diluted etherifying reagent solution prepared according to Example 1 and enough lime (2.5 g.) to provide a slurry pH of 10.9 after 1 hour at 42° C. The slurry was held under a nitrogen atmosphere at 42° C. for 20 hours with slow stirring. It was then neutralized to about 6 pH with acetic acid and filtered. The recovered starch product, after washing and drying at room temperature, contained 0.25% nitrogen and was strongly cationic to Light Green SF dye. Its 0.5% paste in water at 95° C. was sirupy and somewhat cloudy but it was stable to centrifuging for 5 minutes at 350 gravities.

*Example 26*

This example illustrates the ineffectiveness of dichloropropyl trimethylammonium chloride as a reagent for preparing a nitrogen-containing cationic derivative of starch.

Crystalline allyl trimethyl ammonium chloride was prepared by vacuum evaporating a water solution of the compound, made as described in Example 1, to a fondant-like mass, dehydrating the mass by azeotropic distillation with isopropanol, dissolving the dehydrated product in 100 ml. of isopropanol at 80° C., and crystallizing it by quickly stirring 2000 ml. of hot acetone into the hot isopropanol solution. The hot solution, which quickly deposited crystalline material, was stirred for 3 hours in an ice bath. The crystalline product, consisting of fine white needles, was collected on a filter by suction, immediately washed with acetone and dried to constant weight at 115° C. Yield of deliquescent product was 118 g. Its halide ion equivalent weight was 138. Calculated value for the allyl compound, $C_6H_{14}ClN$, is 136.

Chlorine gas was passed into a stirred solution of 50 g. of the crystalline allyl trimethyl ammonium chloride in 250 ml. of glacial acetic acid. As the solution temperature rose because of an exothermic reaction, external cooling was applied to keep the temperature at about 35° C. At weight increase of 27 g., the solution changed from colorless to yellow-green and the chlorination appeared to be finished. Acetic acid was removed by vacuum evaporating the reaction solution to a heavy sirup, dissolving the sirup in 200 ml. of isopropanol and again vacuum evaporating the solution to a thick sirup. This was repeated (three times) until the hot sirup had only a faint odor of acetic acid. The final sirup was dissolved in 150 ml. of boiling isopropanol and crystallized by stirring the solution for 18 hours while it cooled to room temperature. Yield of crystalline product, after filtration, washing with acetone and drying at 115° C. was 40 g. Its halide ion equivalent weight was 207. Calculated value for the dichloropropyl compound, $C_6H_{14}Cl_3N$, is 207.

Ten grams of the crystalline compound was placed in a 500 ml. flask with 100 g. of corn starch and 5 g. of lime. The slurry was stirred for 24 hours at 50° C. and 11.0–10.8 pH, neutralized to about 5 pH with hydrochloric acid and filtered. The starch cake was washed with water and dried at room temperature. The starch reaction product was slightly cationic to Light Green SF dye, but its nitrogen content was only 0.09%, an increase of only 0.04% over the parent starch. Paste properties of the reaction product were essentially the same as those of the parent starch. Both gave rather thin turbid 2% pastes in water at 95° C. which, after dilution to 0.5% and centrifuging for 5 minutes at 350 gravities, deposited considerable amounts of cloudy gelatinous material.

Since many embodiments of this invention may be made and since many changes may be made in the embodi-

We claim:

1. A method of preparing a cationic starch ether that comprises reacting starch and a quaternary halohydrin salt with an alkaline catalyst, said halohydrin salt being obtained by reacting hypohalous acid with an allyl quaternary halide salt of a tertiary amine, said allyl salt being essentially free from excess allyl halide and allyl alcohol, said tertiary amine being selected from the group consisting of (1) tertiary amines whose three nitrogen substituents are selected from the class consisting of alkyl of up to 12 carbon atoms, cyclohexyl, phenyl and benzyl such that, when the three substituents are the same, none has more than 6 carbon atoms and, when any substituent has more than 6 carbon atoms, the other two are alkyl of up to 2 carbon atoms, and (2) heterocyclic tertiary amines wherein the third substituent on the nitrogen of the ring is lower alkyl, the heterocyclic ring being selected from the group consisting of morpholinyl, pyrrolidyl and piperidyl, each having up to one alkyl ring substituent of not more than two carbon atoms.

2. The method of claim 1 in which the tertiary amine is trimethylamine.

3. The method of claim 1 in which the allyl quaternary halide salt is a reaction product of allyl chloride.

4. The method of claim 3 in which the tertiary amine is trimethylamine.

5. The method of claim 3 wherein tertiary amine is in stoichiometric excess of allyl chloride.

6. The method of claim 1 in which the halohydrin is formed by reacting chlorine with water and the allyl quaternary halide salt is dissolved in said water.

7. The method of claim 1 wherein said halohydrin is cyclized prior to addition to the starch reaction mixture.

8. A method of preparing a granular cationic starch ether that comprises reacting granular starch and a halohydrin salt with alkaline catalyst under non-gelatinizing condition, said halohydrin salt being obtained by reacting hypohalous acid with an allyl quaternary halide salt of a tertiary amine, said allyl salt being essentially free from excess allyl halide and allyl alcohol, said tertiary amine being selected from the group consisting (1) tertiary amine whose three nitrogen substituents are selected from the class consisting of alkyl of up to 12 carbon atoms, cyclohexyl, phenyl and benzyl, such that, when the three substituents are the same, none has more than 6 carbon atoms and, when a substituent has more than 6 carbon atoms, the other two are alkyl of up to 2 carbon atoms, and (2) heterocyclic tertiary amines the third substituent on the nitrogen of the ring is lower alkyl, the heterocyclic ring being selected from the group consisting of morpholinyl, pyrrolidyl and piperidyl, each having up to one alkyl ring substituent of not more than two carbon atoms, and isolating the granular cationic starch.

9. The method of claim 8 wherein the granular starch, halohydrin and alkali are mixed together in water at a temperature at least 30° C. below the gelatinization temperature of the starch.

10. The method of claim 8 wherein that alkali is calcium hydroxide.

11. The method of claim 8 wherein said alkali comprises sodium hydroxide.

12. The method of claim 8 wherein said starch etherification reaction is carried out at a pH of 9.5 to 13.

13. The method of claim 8 wherein said tertiary amine is in stoichiometric excess of the allyl halide.

14. A method of preparing a granular cationic starch ether that comprises reacting granular starch and a vic-chlorohydroxypropyl trimethyl ammonium halide with alkaline catalyst under non-gelatinizing conditions, said vic-chlorohydroxypropyl trimethyl ammonium chloride being obtained by reacting hypochlorous acid with an allyl quaternary halide salt of trimethyl amine, said allyl salt being substantially free from excess allyl halide and allyl alcohol, and isolating said granular product.

15. The method of claim 14 wherein said starch etherification reaction is carried out at a pH of 9.5 to 13 and the temperature of said reaction is at least 30° C. below the gelatinization temperature of the granular starch.

16. The method of claim 14 wherein said vic-chlorohydroxypropyl trimethyl ammonium chloride is cyclized prior to addition to the starch reaction mixture.

References Cited

UNITED STATES PATENTS

| | | | |
|---|---|---|---|
| 2,876,217 | 3/1959 | Paschall | 260—233.3 |
| 3,017,294 | 1/1962 | Meisel | 260—233.3 X |
| 3,243,426 | 3/1966 | Caesar | 260—233.3 |

OTHER REFERENCES

Morrison and Boyd: "Organic Chemistry," Allyn and Bacon (Boston, 1961), p. 421.

DONALD E. CZAJA, *Primary Examiner.*

LEON J. BERCOVITZ, *Examiner.*

R. W. MULCAHY, *Assistant Examiner.*